US010965769B2

(12) United States Patent
Sabato

(10) Patent No.: US 10,965,769 B2
(45) Date of Patent: Mar. 30, 2021

(54) AIRBORNE DATA LIBRARY

(71) Applicant: ISRAEL AEROSPACE INDUSTRIES LTD., Lod (IL)

(72) Inventor: Moshe Sabato, Yishuv Hashmonayim (IL)

(73) Assignee: ISRAEL AEROSPACE INDUSTRIES LTD., Lod (IL)

( * ) Notice: Subject to any disclaimer, the term of this patent is extended or adjusted under 35 U.S.C. 154(b) by 0 days.

(21) Appl. No.: 15/525,428

(22) PCT Filed: Nov. 10, 2015

(86) PCT No.: PCT/IL2015/051084
§ 371 (c)(1),
(2) Date: May 9, 2017

(87) PCT Pub. No.: WO2016/075686
PCT Pub. Date: May 19, 2016

(65) Prior Publication Data
US 2018/0248967 A1    Aug. 30, 2018

(30) Foreign Application Priority Data

Nov. 13, 2014    (IL) .......................................... 235692

(51) Int. Cl.
*H04L 29/08*    (2006.01)
*G06F 16/23*    (2019.01)
(Continued)

(52) U.S. Cl.
CPC .......... *H04L 67/28* (2013.01); *G06F 16/2379* (2019.01); *G06F 16/9537* (2019.01);
(Continued)

(58) Field of Classification Search
CPC ......... H04L 67/28; H04L 67/12; H04L 67/18; H04B 7/18504; G06F 17/30377; G06F 17/3087
(Continued)

(56) References Cited

U.S. PATENT DOCUMENTS 5,883,586 A * 3/1999 Tran ....................... G01C 23/00
340/945
6,840,480 B2    1/2005 Carroll et al.
(Continued)

FOREIGN PATENT DOCUMENTS

EP    2477107 A1    7/2012

OTHER PUBLICATIONS

Carney, D. T. (2008). Unmanned aircraft systems' role in network centric warfare. U.S. Army War College, Carlisle Barracks, PA.
(Continued)

*Primary Examiner* — Kristie D Shingles
(74) *Attorney, Agent, or Firm* — Dorsey & Whitney LLP

(57) ABSTRACT

The disclosed subject matter includes, an airborne data library onboard an airborne platform, configured for automatic management of situation awareness data (SAD), the airborne data library comprising an onboard data management system; the on-board data management system comprises a data management unit and an onboard data-repository; the data management unit being operatively connectible to at least one computer processor and configured to: establish a communication link with at least one situation awareness data (SAD) source; obtain situation awareness data from the at least one SAD source; process the SAD based on data management logic being accessible to the data management unit.

20 Claims, 4 Drawing Sheets

(51) Int. Cl.
*G06F 16/9537* (2019.01)
*H04B 7/185* (2006.01)

(52) U.S. Cl.
CPC ......... *H04B 7/18504* (2013.01); *H04L 67/12* (2013.01); *H04L 67/18* (2013.01)

(58) Field of Classification Search
USPC ........................................................ 709/219
See application file for complete search history.

(56) References Cited

U.S. PATENT DOCUMENTS

| | | | |
|---|---|---|---|
| 7,024,340 B2 | 4/2006 | Nichols et al. | |
| 7,039,367 B1 | 5/2006 | Kucik | |
| 7,058,710 B2 | 6/2006 | McCall et al. | |
| 7,420,476 B2 * | 9/2008 | Stiffler | G01C 23/00 340/945 |
| 7,471,995 B1 | 12/2008 | Robinson et al. | |
| 8,109,529 B2 * | 2/2012 | Rand | A61G 5/022 280/244 |
| 8,140,215 B2 | 3/2012 | Paquette et al. | |
| 8,905,358 B2 * | 12/2014 | Abershitz | B64C 39/024 244/13 |
| 9,254,363 B2 * | 2/2016 | Levien | G05D 1/0011 |
| 10,019,000 B2 * | 7/2018 | Levien | G05D 1/00 |
| 2003/0093187 A1 * | 5/2003 | Walker | B64D 45/0059 701/1 |
| 2006/0069497 A1 * | 3/2006 | Wilson, Jr. | G08G 5/0013 701/120 |
| 2008/0025334 A1 | 1/2008 | Smith et al. | |
| 2012/0190386 A1 * | 7/2012 | Anderson | G01S 19/14 455/456.3 |
| 2013/0238658 A1 * | 9/2013 | Burris | G06F 17/30545 707/770 |
| 2013/0323686 A1 * | 12/2013 | Wenger | G09B 9/08 434/29 |
| 2017/0178516 A1 * | 6/2017 | Shenfeld | G08G 5/0008 |

OTHER PUBLICATIONS

Aeronautics, NCW—Network Centric Warfare, accessed as early as Jun. 22, 2017 at https://web.archive.org/web/20140823103106/http://www.aeronautics-sys.com/ncw_network_centric_warfare.

Keightley, D. E., & Gale, K. L. (Oct. 2006). Bandwidth-smart UAV video systems in distributed networked operations. In Military Communications Conference, 2006. MILCOM 2006. IEEE (pp. 1-5).

* cited by examiner

AIRBORNE DATA LIBRARY

FIELD OF THE PRESENTLY DISCLOSED SUBJECT MATTER

The presently disclosed subject matter relates to the field of situation awareness data dissemination.

BACKGROUND

Network centric warfare is a military doctrine which strives to integrate advanced information and communication technologies for the purpose of enabling rapid information-sharing between geographically dispersed forces in battlefields.

Communication relay stations are used in the field of communication for various purposes, such as: increasing communication range, overcoming physical obstacles obscuring communication line of sight, increasing flexibility, and security of communications systems, etc.

Unmanned airborne vehicles (UAVs, also known as unmanned airborne systems (UAS) or drones) facilitated as relay stations can circle a certain mission area while serving as a communication relay point for forwarding communication transmission between various forces in mission areas. Using UAVs as a network centric warfare component enables in general to increase the robustness as well as the range, quality, flexibility and quantity of information sharing.

GENERAL DESCRIPTION

According to one aspect of the presently disclosed subject matter there is provided an airborne data library onboard an airborne platform, configured for automatic management of situation awareness data (SAD), the airborne data library comprising:

an onboard data management system; the onboard data management system comprises a data management unit and an onboard data-repository; the data management unit being operatively connectible to at least one computer processor and configured to:

establish a communication link with at least one situation awareness data (SAD) source; obtain situation awareness data from the at least one SAD source; process the SAD and determine, based on data management logic being accessible to the data management unit, at least one of the following:
  a) whether to store the obtained SAD locally in the onboard data-repository and/or whether to transmit the obtained SAD to a remote data-repository unit;
  b) whether or not to automatically provide the obtained SAD to one or more participating entities; and automatically provide the obtained SAD to one or more participating entities depending on the determination.

In addition to the above features, the airborne data library according to this aspect of the presently disclosed subject matter can optionally comprise one or more of features (i) to (vi) below, in any desired combination or permutation.

i. wherein the airborne platform is an Unmanned Aerial Vehicle configured to fly above a mission area and provide SAD to participating entities operating in the mission area.

ii. wherein the data management logic includes one or more of the following parameters: location of the participating entities with respect to a mission area; type and function of the participating entities; rank of the participating entities.

iii. wherein the onboard data management system is configured to continuously search different SAD sources for new and/or updated SAD; and determine whether to store in the onboard data-repository the new and/or updated SAD based on the data management logic.

iv. wherein the obtained SAD pertains to a mission area and/or to participating entities operating within or with respect to the mission area.

v. the airborne data library further comprises an information server configured to provide SAD responsive to received requests.

vi. wherein the data management unit is configured, responsive to a request issued by a participating entity, to provide needed SAD pertaining to a certain area of interest to:

determine a current location of one or more SAD acquiring entities; select at least one SAD acquiring entity from among the one or more SAD acquiring entities, if a location of the at least one SAD is within an acceptable distance from the location of interest; and send a request to the selected acquiring entity to provide the needed SAD.

According to another aspect of the presently disclosed subject matter there is provided a method of managing situation awareness data (SAD) in an onboard data library; the method comprising using an onboard data management system installed onboard the airborne vehicle for:

establishing a communication link with at least one situation awareness data (SAD) source;

obtaining situation awareness data from the at least one SAD source;

processing the SAD and determining, based on data management logic being accessible to the data management unit, at least one of the following:
  a) whether to store the obtained SAD locally in the onboard data-repository and/or whether to transmit the obtained SAD to a remote data-repository unit;
  b) whether or not to automatically provide the obtained SAD to one or more participating entities; and automatically provide the obtained SAD to one or more participating entities depending on the determination.

According to another aspect of the presently disclosed subject matter there is provided a non-transitory program storage device readable by machine, tangibly embodying a program of instructions executable by the machine operated in an airborne data library to perform a method of managing situation awareness data (SAD); the method comprising:

establishing a communication link with at least one situation awareness data (SAD) source;

obtaining situation awareness data from the at least one SAD source;

processing the SAD and determining, based on data management logic being accessible to the data management unit, at least one of the following:
  a) whether to store the obtained SAD locally in the onboard data-repository and/or whether to transmit the obtained SAD to a remote data-repository unit;
  b) whether or not to automatically provide the obtained SAD to one or more participating entities; and automatically provide the obtained SAD to one or more participating entities depending on the determination.

According to another aspect of the presently disclosed subject matter there is provided a UAV configured to operate as an airborne data library, the airborne data library is configured for automatically managing situation awareness data (SAD), the airborne data library comprising:

an onboard data management system; the onboard data management system comprises a data management unit and an onboard data-repository; the data management unit being operatively connectible to at least one computer processor and configured to:

establish a communication link with at least one situation awareness data (SAD) source; obtain situation awareness data from the at least one SAD source; process the SAD and determine, based on data management logic being accessible to the data management unit, at least one of the following:
a) whether to store the obtained SAD locally in the onboard data-repository and/or whether to transmit the obtained SAD to a remote data-repository unit;
b) whether or not to automatically provide the obtained SAD to one or more participating entities; and automatically provide the obtained SAD to one or more participating entities depending on the determination.

The method, the non-transitory program storage device and UAV disclosed in accordance with the presently disclosed subject matter can optionally comprise one or more of features (i) to (vi) listed above, mutatis mutandis, in any desired combination or permutation.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

DETAILED DESCRIPTION

Unless specifically stated otherwise, as apparent from the following discussions, it is appreciated that throughout the specification discussions utilizing terms such as "establishing", "determining", "transmitting", "providing" or the like, include action and/or processes of a computer that manipulate and/or transform data into other data, said data represented as physical quantities, e.g. such as electronic quantities, and/or said data representing the physical objects.

The terms "computer", "computerized device", "machine", "computer processor" or variation thereof should be expansively construed to cover any kind of hardware electronic device with data processing capabilities, including, by way of non-limiting example, a personal computer, a server, a computing system, a communication device, a processor (e.g. digital signal processor (DSP), a microcontroller, a field programmable gate array (FPGA), an application specific integrated circuit (ASIC), etc.), any other electronic computing device, and or any combination thereof.

Onboard data management system 200 described herein can be configured as a hardware computerized device or as part thereof or be operatively connected to a hardware computerized device configured for executing related operations as described herein. The computerized device may be a computerized device specially constructed for the desired purposes as well as a general purpose computer specially configured for the desired purpose by a computer program stored in a computer readable storage medium.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable subcombination.

Figure 2:
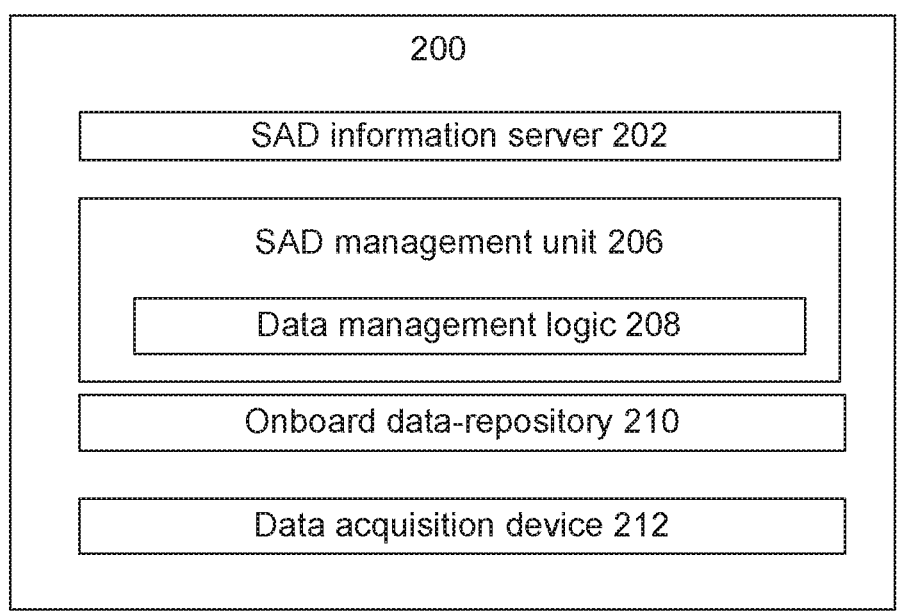
FIG. 2 is a functional block diagram of an onboard data management system 200 installed onboard UAV 150 according to an example of the presently disclosed subject matter.
Figure 3:
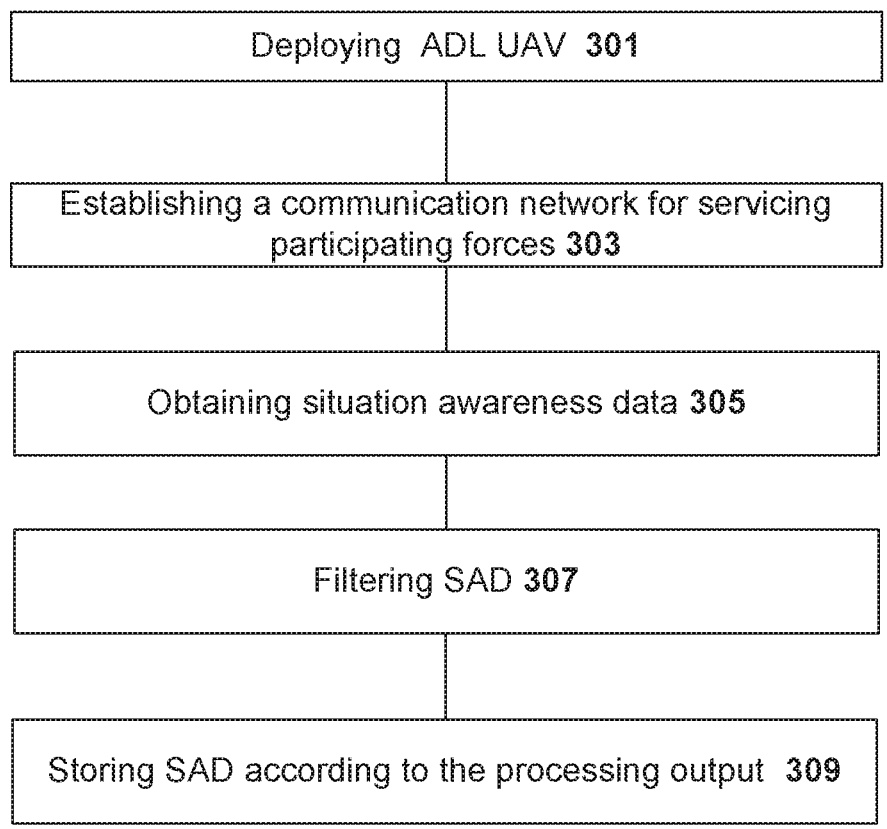
FIG. 3 is a flowchart exemplifying operations performed according to some examples of the presently disclosed subject matter.
Figure 4:
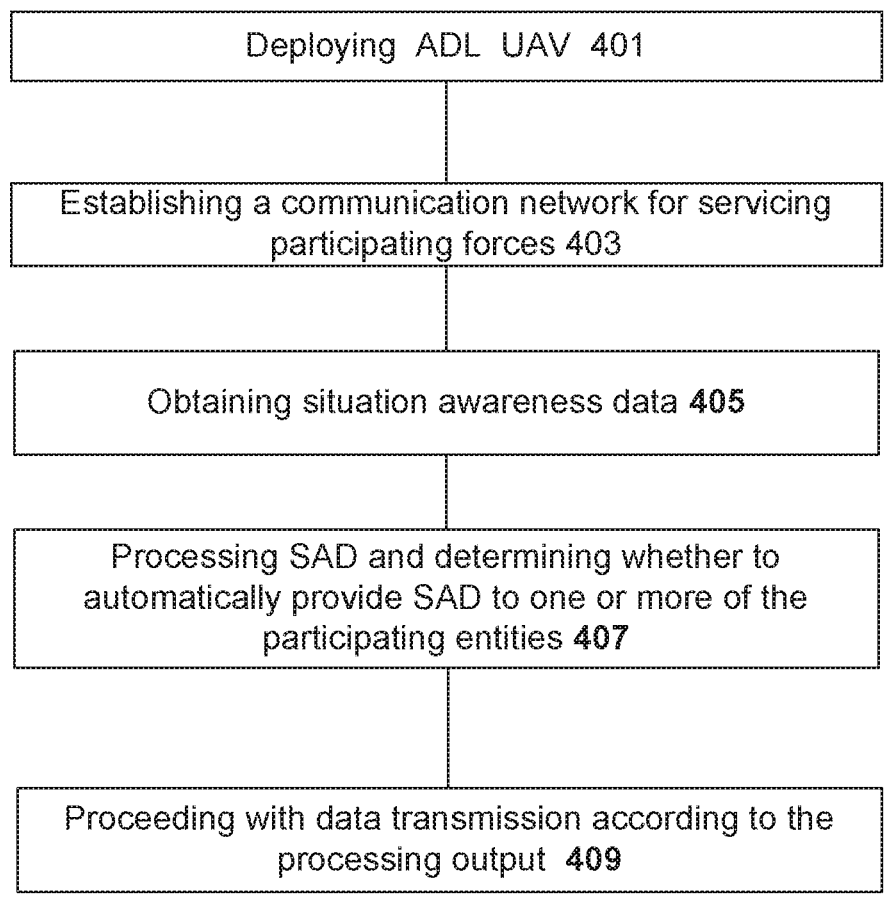
FIG. 4 is another flowchart exemplifying operations performed according to some examples of the presently disclosed subject matter.

In embodiments of the presently disclosed subject matter, fewer, more and/or different stages than those shown in FIGS. 3 and 4 may be executed. In embodiments of the presently disclosed subject matter one or more stages illustrated in FIGS. 3 and 4 may be executed in a different order (for example operations described below with reference to block 303 in FIG. 3 can be performed before or substantially together with the operation described with reference to block 301) and/or one or more groups of stages may be executed simultaneously. Functional elements in FIG. 2 can be made up of a combination of software and hardware and/or firmware that performs the functions as defined and explained herein. Some functional elements in FIG. 2 can comprise at least one respective computer processor and/or computer memory or can be a part of a computer processor or of a computer memory, or be otherwise operatively connected to a computer processor the computer processor and the memory being configured for executing instructions for performing respective functions.

Throughout this description, the term "Unmanned Aerial Vehicle" (UAV) is used as an example of an aerial platform used for implementing an airborne data library which is disclosed herein. It is noted that the term "UAV" is used by way of example for reasons of clarity and simplicity and should not be construed to limit the scope of this description to UAVs only. It should be clear to a skilled person, that other types of airborne platforms (e.g. manned airborne platforms) are likewise contemplated within the scope of the presently disclosed subject matter.

Figure 1:
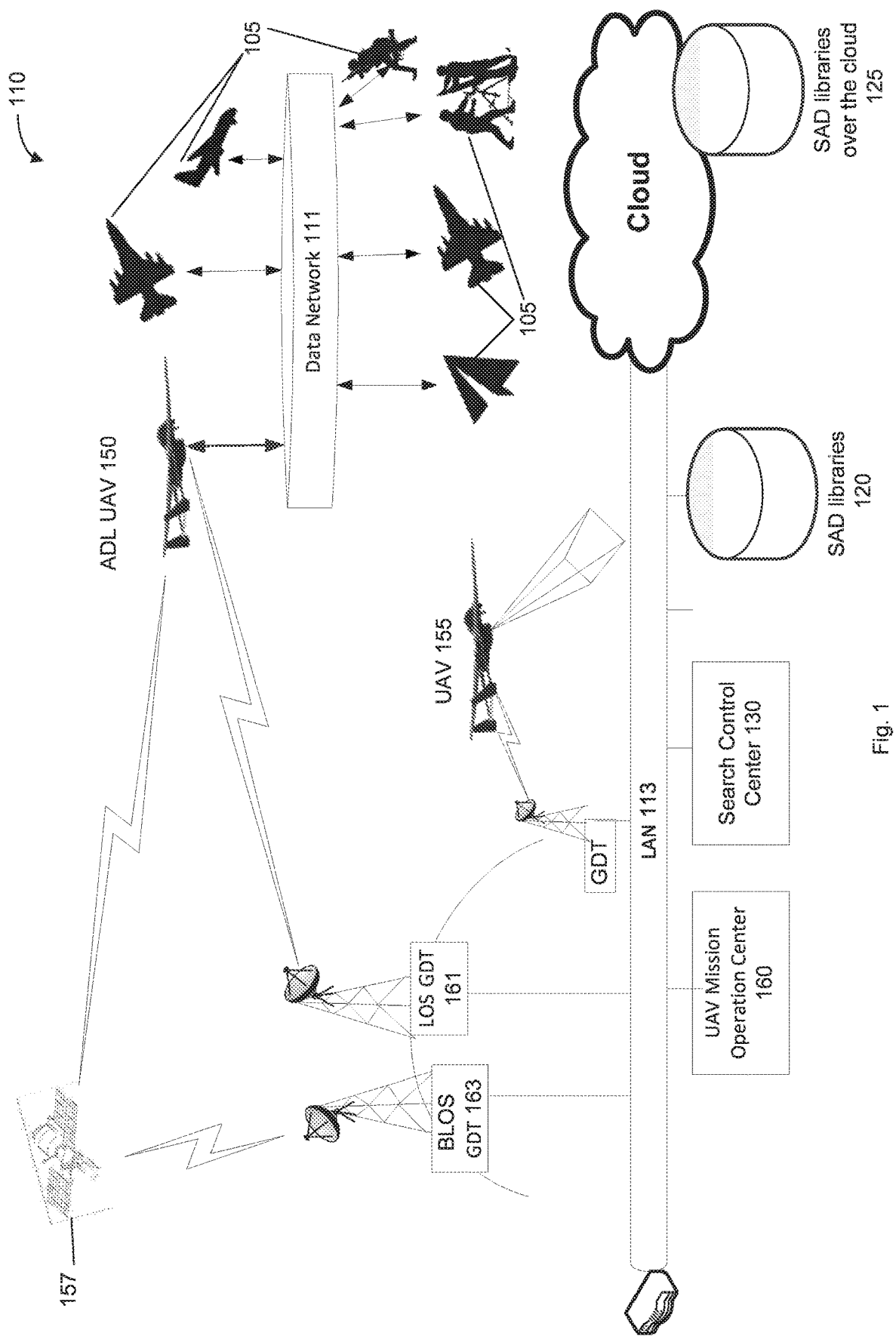
FIG. 1 is a schematic illustration demonstrating a communication network according to the network centric warfare paradigm.

Bearing the above in mind, attention is now drawn to FIG. 1 showing a schematic illustration exemplifying a communication network according to the paradigm of network centric warfare. Network centric warfare which was originally developed for military proposes can also be advantageous in other non-combat operational mission scenarios such as fire-fighting and search and rescue missions.

In operational mission scenarios, task forces participating in a mission (herein "participating entities") make use of situation awareness data (SAD) which is necessary for completing the mission. It is noted that the term "participating entities" is used herein to include any type of task force, manned (comprising any number of persons, e.g. 1 or 2 or 3 or more) or unmanned, including both entities located within a given mission area and entities located outside the mission area and engaged in operations related to the mission area or to entities located therein (e.g. commanding forces located outside the mission area).

Situation awareness data includes for example intelligence, surveillance and reconnaissance (ISR) information. ISR information includes for example data indicative of the geographical characteristics of the terrain of the mission area (including various types of printed as well as digital maps of the mission area), information with respect to enemy forces located within the mission area and/or in the surrounding vicinity outside the mission area, various munitions available to the enemy forces within and/or outside the mission area, friendly forces within and/or outside the mission area, supply lines within and/or outside the mission area, location and characteristics of potential threats located within and/or outside the mission area (e.g. land mines and pit caves) which should be avoided. Situation awareness data can comprise additional information such as weather forecasts (e.g. in fire fighting missions, wind direction is very important) and battle damage assessment information after an attack.

SAD can be obtained by participating entities as part of a preliminary stage before the onset of the mission. In addition, new SAD as well as updates to previously obtained SAD can be provided to participating entities after their deployment in the mission area. As illustrated in FIG. 1 participating entities (105) can communicate with various data sources for obtaining needed SAD.

Data sources which are illustrated in FIG. 1 include SAD libraries 120 configured for storing available SAD as well as various SAD acquiring entities which collect SAD in real-time during the execution of the mission. SAD acquiring entities include for example forces specifically assigned to SAD collection missions (e.g. UAV 155) as well as other data acquiring entities (e.g. satellite 157). SAD acquiring entities can further include participating entities which collect SAD during the mission execution. For example, aircrafts and/or ground forces (105) which are equipped with data acquisition devices (e.g. camera installed onboard an aircraft or carried by an infantry soldier) and used for gathering SAD as the forces operate in the mission area. For example, various portable situation awareness devices exist today which are used by ground forces. These devices enable forces to obtain situation awareness data from remote data repositories and to share real-time information between different task forces participating in the mission.

SAD libraries 120 can include data storage devices configured for storing archived data which has been gathered and stored in the libraries previous to the onset of the mission as well as real-time data which is obtained and uploaded by various SAD acquiring entities in real-time during execution of the mission. The uploaded data is stored in SAD libraries and made available to participating entities.

Optionally, SAD libraries 120 can be connected over a communication network (e.g. oven an Ethernet LAN network 113) to a cloud network used for storing additional information. SAD libraries 120 can be further connected over a communication network to a SAD data search engine control system 130. Control system 130 can include one or more computerized devices configured to operate as query servers. Specifically, control system 130 can be configured to receive data queries from various participating entities (e.g. forces operating in the mission area as well as commanding forces overseeing the mission progress), search for the requested data and provide the data to the requesting entity.

Participating entities 105 engaged in a mission (e.g. combat, fire extinguishing, search and rescue operations, etc.) can be connected to data network 110 for obtaining real-time situation awareness data. In some cases participating entities can directly communicate with control center 130 and SAD libraries 120 not through network 110. However, due to lack of line of sight communication network this communication option may not always be available.

Accordingly, SAD can be obtained by directly accessing control system 130. Alternatively or additionally, control system 130 can be accessed through an intermediate network node such as a communication relay station. FIG. 1 shows airborne data library (ADL) UAV 150 operating as an airborne relay station for providing on demand SAD to requesting entities (e.g. forces in a battlefield). According to the illustrated example, ADL UAV 150 is connected over network 111 to various participating entities. ADL UAV 150 can provide to the participating entities 105 SAD and obtain SAD from the participating entities 105, over network 111. ADL UAV 150 is configured to receive queries received from a requesting entity and forward the queries to search control center 130, receive from control center 130 the requested information and transmit the information to the requesting entity.

ADL UAV 150 is controlled by UAV mission operation center 160 which can comprise core UAV control system (CUCS) configured for controlling the UAV. According to the requirements of STANAG 4586, which is the NATO specification of a core UAV control system, the control station comprises a client module (CM) connected to an application servers unit (APU) and a vehicle specific module (VSM). UAV mission operation center 160 is operatively connected to a line of sight ground data terminal (LOS GDT 161) and respective antenna. UAV mission operation center 160 can be further operatively connected to a beyond line of sight ground data terminal (BLOS GDT 163) and respective antenna for enabling satellite communication with UAV 150.

The client module is configured to enable an operator to monitor and control the operation of a respective UAV assigned to UAV mission operation center 160 and can be implemented on various types of computerized devices including by way of non-limiting example, PC or laptop computers or any other computerized device which comprises computer memory (e.g. volatile and non-volatile) and one or more computer processors configured with the required processing capabilities. Information received from UAV 150 at UAV mission operation center 160 can be displayed on the client module and the operator can use the client module for sending information (e.g. various commands) to UAV 150.

According to the presently disclosed subject matter ADL UAV 150 is also configured to operate as an autonomously managed airborne data library capable of obtaining, storing and providing SAD to participating entities.

In addition to the operation of ADL UAV 150 for servicing requests which are issued by the participating entities, according to the presently disclosed subject matter ADL UAV 150 is configured as an automatic and autonomic SAD dissemination information station configured to automatically and autonomously provide SAD to participating entities based on a predefined sharing policy (implemented by data management logic) thereby increasing information availability to participating entities as well as real-time information sharing capabilities between participating entities.

FIG. 2 is a functional block diagram of an onboard data management system 200 installed onboard ADL UAV 150.

System 200 is configured in general to obtain SAD from various sources and autonomously determine which obtained information should be stored in the data-repository located onboard UAV 150. System 200 is further configured to determine, upon receiving new and/or updated SAD, which of the participating entities require or may otherwise benefit from the newly available SAD and automatically provide the SAD accordingly.

As illustrated by way of example in FIG. 2, onboard data management system 200 can comprise a SAD information server 204, SAD management unit 206, and onboard data-repository 210. Optionally, UAV 105 can comprise one or more data acquisition devices 212 (e.g. camera, radar, etc.) however, this is not necessary and according to some examples UAV 105 can obtain all SAD from external sources and operate as an airborne data library without autonomous SAD acquisition capabilities.

SAD information server 204 is a computerized device operatively connected to a communication unit (configured for facilitating communication between UAV 150 and other entities) and configured to provide SAD to, as well as to receive, SAD from the various entities participating in a mission. SAD information server 204 can be configured to provide SAD to one or more participating entities responsive to a request issued by the participating entities. SAD information server 204 can also be configured to provide SAD to one or more participating entities based on predefined data management logic without a request being initially issued by the participating entity.

In general, data which is stored in data-repository 210 onboard UAV 105 can be accessed more quickly than data which is stored in ground SAD libraries and can thus allow shortening the retrieval time of queries made by various participating entities.

As the storage space of data-repository 210 is limited, it is advantageous to store in data-repository 210 high priority SAD and to store in other SAD libraries, which are more remotely located and thus less accessible, SAD which is considered not as important. High priority SAD can include for example SAD which is considered important for completing an ongoing mission. To this end, onboard data management system 200 comprises data management unit 206 which is configured to determine whether a given data should be kept in data-repository 210 or whether it should be transmitted to a different data-repository and not stored in data-repository 210. Data management unit 206 can be configured to make use of data management logic which defines rules for making this determination.

In addition, in the event that new information is obtained by onboard data management system 200, SAD management unit 206 can be configured, to determine to which of the participating entities the obtained information should be provided. To this end data management logic includes rules for automatically providing information to one or more participating entities. Data management logic can thus be used by SAD management unit 206 for making the determination to which of the participating entities the data should be transmitted. In the event that it is determined that at least one participating entity should be provided with new SAD, SAD management unit 206 generates instructions for transmitting information to the entity. The SAD can be transmitted to participating entities by SAD information server 202.

FIG. 3 is a flowchart illustrating an example of operations performed, in accordance with the presently disclosed subject matter. Operations described with reference to FIG. 3 (and FIG. 4 below) can be executed for example by system 200 described above.

At block 301 an ADL UAV (150) is deployed. As described above, the ADL UAV is equipped with an onboard data management system 200 configured for autonomous management of SAD. The ADL UAV is deployed to enable on-demand as well as automatic provision of SAD to participating entities taking part in a certain mission area and/or operating within a certain mission area. To this end, the ADL UAV is navigated to the relevant mission area where it can communicate and provide service to the participating entities.

At block 303 the ADL UAV is connected to a communication network 111 which facilitates communication between the ADL UAV and the participating entities. ADL UAV can be further connected to ground SAD libraries and via LOS and BLOS GDTs.

At block 305 ADL UAV obtains SAD. The SAD can be obtained responsive to a request issued by any one of the participating entities (i.e. pull) or as data upload initiated by any one of the SAD data sources (i.e. push).

In the former case (pull), responsive to a request issued by a participating entity, onboard data management system 200 is configured to determine whether the requested information is available in onboard data-repository and if so, to provide the requested information. Otherwise, onboard data management system 200 is configured to send a search query to different data sources connected to the communication network 111, or otherwise connected to the ADL UAV (e.g. communication with SAD libraries can be established via GDTs and LAN 113), asking for the requested information. According to one example, the query can be sent to search control center 130 which is configured to generate and transmit corresponding search queries to various libraries for searching for the requested information.

Alternatively or additionally, onboard data management system 200 can be configured to process the request and determine which of the participating entities is capable of providing the requested information, and send a request to these entities accordingly. For example, assuming a participating entity has sent a request for an aerial photograph of a certain area of interest within the mission area, onboard data management system 200 can identify an ISR UAV (UAV deployed in ISR collection mission) which is equipped with a camera and issue a request to the ISR UAV for a photograph of the area of interest in the mission area. Responsive to the request, the ISR UAV can fly above the area of interest, take the requested photographs and transmit them to the ADL UAV, which in turn can provide them to the requesting entity.

Furthermore, onboard data management system 200 can be configured to determine whether any of the participating entities are located at an acceptable distance from the area of interest (e.g. a distance from which needed SAD can be obtained in reasonable time). If a participating entity is found in the vicinity of the area of interest and it is equipped with an appropriate data acquisition device, system 200 can issue a request to provide the requested SAD. To this end, onboard data management system 200 can be configured to maintain knowledge (or be otherwise capable of obtaining such knowledge in real-time) with respect to the current location of the participating entities and the image acquisition devices available to each participating entity.

In addition, onboard data management system 200 can be configured to automatically request SAD from various SAD sources according to predefined SAD updating rules. For example, onboard data management system 200 can maintain a continuous connection to various SAD sources and continuously check whether new or updated SAD is available. Updated SAD can be stored in data-repository 210 according to data management logic.

In the latter case (push), participating entities equipped with data acquisition devices can upload to the ADL UAV acquired data. Various participating entities can be configured with various sharing policies, defining the conditions for sharing acquired information. For example, some participating entities can be configured to automatically upload to ADL UAV all acquired SAD. According to another example, some participating entities can be configured to automatically upload to the ADL UAV only part of the acquired SAD. According to this example, uploading of acquired SAD can be dependent on various parameters such as the type of acquired data (photograph, radar output, weather forecast, etc.), a location where the SAD was acquired, whether or not currently acquired SAD is different than previously acquired SAD, etc. Different participating entities in a given mission can be configured with different sharing policies.

At block 307 responsive to obtaining new SAD, an automatic filtering process is executed. During filtering, the obtained SAD is processed and a decision is made as to whether or not to store the obtained SAD locally in onboard data-repository 210 or otherwise transmit the new SAD to a remote data-repository. This decision can be made based on data management logic (e.g. with the help of onboard data management system 200). Following the filtering process, data is either stored locally, onboard ADL UAV, or transmitted to a remote data-storage based on the filtering output (block 309).

Data management logic can be based on various parameters. The following are some non-limiting examples which demonstrate the principle of data management logic. Data management logic can be based on whether or not recently obtained SAD, include new information to SAD already stored in data-repository 210. If recently obtained SAD is identical to (or not significantly different than) previously SAD stored in data-repository 210 only one copy of the information is maintained in data-repository 210.

Data management logic can be based on information pertaining to the specific participating entities located within a certain predefined mission area. More specifically, onboard data management system 200 can be configured to store locally data which is of particular relevance to the specific forces deployed in a currently ongoing mission. For instance, if SAD obtained by ADL UAV includes information with respect to pit caves recently identified in the mission area ground, the new SAD is stored in data-repository 210 if there are ground forces operating within the mission area. Otherwise (e.g. if there are only airborne forces operating within the mission area) the obtained SAD is transmitted to be stored in a remote data repository (e.g. SAD libraries 120). In another example, data pertaining to enemy forces and/or friendly forces are stored in data-repository 210 if they are located within the mission area or at a certain predefined distance from the mission area. Otherwise, the data is transmitted and stored in another remote data-repository.

In a further example, data management logic can include rules related to the type of SAD which is being obtained. For example, if a query pertaining to a specific type of SAS has been previously made within a predefined period of time by any one of the participating entities, this can be considered as an indication that this specific type of data is likely to be of interest to the participating entities. Accordingly, any new SAD pertaining to the same specific type of data is stored in data repository 210.

Once a decision is made (e.g. by onboard data management system 200) as to whether the obtained SAD should be stored in data-repository 204 or not, the obtained SAD is stored in the onboard data-repository or in a different, remote data-repository according to the decision (block 309).

FIG. 4 is a flowchart illustrating an example of operations performed, in accordance with the presently disclosed subject matter. Blocks 401 to 405 pertain to similar operations described above with reference to block 301 to 305 and therefore will not be described in detail.

At block 407, responsive to obtaining new SAD (block 405) the obtained SAD is processed (e.g. with the help of onboard data management system 200) and a decision is made as to whether or not to automatically transmit the obtained SAD to one or more of the entities participating in an ongoing mission. As explained above, data management logic defines the rules of SAD sharing policy which are used by onboard data management system 200 for determining to which (if any) of the participating entities obtained SAD should be automatically transmitted.

The following are some non-limiting examples which demonstrate the principle of data management logic. According to one example, data management logic can define certain types of data which are automatically shared with all participating entities. For example SAD pertaining to the location of friendly forces may always be shared with all participating entities to avoid friendly fire.

According to another example, data sharing can be location based, where onboard data management system 200 can be configured to process the SAD pertaining to the location of friendly forces and transmit this information only to participating entities which are located within a certain distance from that location. To this end, onboard data management system 200 is provided with access to information pertaining to all participating entities. As mentioned above, onboard data management system 200 can be configured to maintain knowledge (or be otherwise capable of obtaining such knowledge in real-time) with respect to the current location of the participating entities. A change in the current location of a participating entity may reflect on the decision made by onboard data management system 200 whether or not to share the SAD.

According to another example, some information sharing defined by data management logic can be dependent on the relevance of the obtained SAD to the specific function of the different participating entities. For instance, SAD which is related to casualties may be automatically transmitted only to specific participating entities such as those responsible for treating the wounded and/or transporting them out of the mission area.

According to yet another example, information sharing defined by data management logic can be dependent on the rank of the participating entity where certain SAD may be limited only to participating entities above a certain rank. For example, onboard data management system 200 can use information indicative of the rank of a participating entity (which can be determined for example based on the rank of the person managing or commanding the entity) and determine, based on the data management logic, whether obtained SAD should be transmitted to the participating entity, given its rank. For instance, in military operations, some SAD may be automatically transmitted only to a participating entity which is being led by an officer above a certain rank.

It is noted that although FIG. 3 and FIG. 4 are illustrated as two separate processes, this is only for the sake of clarity and should not be construed as limiting in any way. The operations illustrated in both FIG. 3 and FIG. 4 can be performed as part of a single integrated process.

It is to be understood that the system according to the presently disclosed subject matter may be a suitably programmed computer. Likewise, the presently disclosed subject matter contemplates a computer program being readable by a computer for executing the method of the presently disclosed subject matter. The presently disclosed subject matter further contemplates a machine-readable memory (including transitory and non-transitory computer memory) tangibly embodying a program of instructions executable by the machine for executing the method of the presently disclosed subject matter.

It is also to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

The invention claimed is:

1. An airborne data library onboard an airborne platform, configured for automatic management of situation awareness data (SAD), the airborne data library comprising:
    an onboard data management system onboard the airborne platform, the onboard data management system comprises a data management unit and an onboard data-repository, the data management unit being operatively connectable to at least one computer processor and configured to:
        establish a remote communication link for directly communicating with at least one situation awareness data (SAD) source and a communication network for communicating with a plurality of participating entities, wherein the at least one data source is inaccessible to the plurality of participating entities; obtain situation awareness data from the at least one SAD source; process the SAD and determine, based on data management logic being accessible to the data management unit, at least the following:
        a) whether to store the obtained SAD locally in the onboard data-repository and/or whether to transmit the obtained SAD to a remote data-repository unit; and
        b) whether or not to automatically provide the obtained SAD to at least one participating entity of the plurality of the participating entities;
    automatically provide the obtained SAD to the at least one participating entity depending on the determination; and
    provide the obtained SAD to at least one participating entity responsive to a request received from the at least one participating entity.

2. The airborne data library according to claim 1 wherein the airborne platform is an Unmanned Aerial Vehicle configured to fly above a mission area and provide SAD to participating entities operating in the mission area.

3. The airborne data library according to claim 1 wherein the data management logic includes one or more of the following parameters:
    location of the participating entities with respect to a mission area;
    type and function of the participating entities; or
    rank of the participating entities.

4. The airborne data library according to claim 1, wherein the onboard data management system is configured to:
    continuously search different SAD sources for new and/or updated SAD; and
    determine whether to store in the onboard data-repository the new and/or updated SAD based on the data management logic.

5. The airborne data library according to claim 1, wherein the obtained SAD pertains to a mission area and/or to participating entities operating within or with respect to the mission area.

6. The airborne data library according to claim 1, further comprising an information server configured to provide SAD responsive to received requests.

7. The airborne data library according to claim 1, wherein the data management unit is configured, responsive to a request issued by a participating entity to provide needed SAD to:
    select a SAD acquiring entity suitable for providing the needed SAD; and
    send a request to the selected SAD acquiring entity to provide the needed SAD.

8. The airborne data library according to claim 7, wherein the data management unit is further configured for selecting a SAD acquiring entity suitable for providing the needed SAD to:
    determine a data acquisition device available to each of one or more SAD acquiring entities;
    select at least one SAD acquiring entity from among the one or more SAD acquiring entities, if an available data acquisition device is appropriate for obtaining the needed SAD; and
    send a request to the selected acquiring entity to provide the needed SAD.

9. The airborne data library according to claim 7, wherein the needed SAD is requested with respect to an area of interest, the data management unit is further configured for selecting a SAD acquiring entities suitable for providing the needed SAD to:
    determine a current location of one or more SAD acquiring entities; and
    select at least one SAD acquiring entity from among the one or more SAD acquiring entities, if a location of the at least one SAD is within a suitable distance from the area of interest.

10. In an airborne data library onboard an airborne platform, a method of managing situation awareness data (SAD); the method comprising:
    using an onboard data management system installed onboard the airborne vehicle for:
        establishing a remote communication link for directly communicating with at least one situation awareness data (SAD) source and a communication network for communicating with a plurality of participating entities, wherein the at least one data source is inaccessible to the plurality of participating entities;
        obtaining situation awareness data from the at least one SAD source;

processing the SAD and determining, based on data management logic being accessible to the data management unit at least the following:
  a) whether to store the obtained SAD locally in the onboard data-repository and/or whether to transmit the obtained SAD to a remote data-repository unit; and
  b) whether or not to automatically provide the obtained SAD to at least one participating entity of the plurality of participating entities;
automatically providing the obtained SAD to the at least one participating entity depending on the determination; and
providing the obtained SAD to at least one participating entity responsive to a request received from the at least one participating entity.

11. The method according to claim 10, further comprising:
wherein the airborne platform is an Unmanned Aerial Vehicle (UAV); and
maneuvering the UAV above a mission area and providing SAD to participating entities operating in the mission area.

12. The method according to claim 10, wherein the data management logic includes one or more of the following parameters:
location of the participating entities with respect to a mission area;
type and function of the participating entities; or
rank of the participating entities.

13. The method according to claim 10, further comprising:
continuously searching different SAD sources for new and/or updated SAD; and
determining whether to store in the onboard data-repository the new and/or updated SAD based on the data management logic.

14. The method according to claim 10, wherein the obtained SAD pertains to a mission area and/or to participating entities operating within or with respect to the mission area.

15. The method according to claim 10, further comprising using an information server onboard for providing SAD responsive to received requests.

16. The method according to claim 10, further comprising:
responsive to a request issued by a participating entity to provide needed SAD:
selecting a SAD acquiring entity suitable for providing the needed SAD; and
sending a request to the selected SAD acquiring entity to provide the needed SAD.

17. The method according to claim 10, wherein the needed SAD is requested with respect to an area of interest, the selecting of a SAD acquiring entity suitable for providing the needed SAD further comprises:
determining a current location of one or more SAD acquiring entities; and
selecting at least one SAD acquiring entity from among the one or more SAD acquiring entities, if a location of the at least one SAD is within an acceptable distance from the area of interest.

18. The method according to claim 16, wherein the selecting of a SAD acquiring entity suitable for providing the needed SAD further comprises:
determining a data acquisition device available to each of one or more SAD acquiring entities;
selecting at least one SAD acquiring entity from among the one or more SAD acquiring entities, if an available data acquisition device is appropriate for obtaining the needed SAD; and
send a request to the selected acquiring entity to provide the needed SAD.

19. A non-transitory program storage device readable by machine, tangibly embodying a program of instructions executable by the machine operated in an airborne data library to perform a method of managing situation awareness data (SAD), the method comprising:
establishing a remote communication link for directly communicating with at least one situation awareness data (SAD) source and a communication network for communicating with a plurality of participating entities, wherein the at least one data source is inaccessible to the plurality of participating entities;
obtaining situation awareness data from the at least one SAD source;
processing the SAD and determining, based on data management logic being accessible to the data management unit, at least the following:
  a) whether to store the obtained SAD locally in the onboard data-repository and/or whether to transmit the obtained SAD to a remote data-repository unit; and
  b) whether or not to automatically provide the obtained SAD to at least one participating entity of the plurality of participating entities;
automatically providing the obtained SAD to the at least one participating entities depending on the determination; and
providing the obtained SAD to at least one participating entity responsive to a request received from the at least one participating entity.

20. An unmanned airborne vehicle (UAV) configured to operate as an airborne data library, the airborne data library being configured for automatically managing situation awareness data (SAD), the airborne data library comprising:
an onboard data management system onboard the UAV;
the onboard data management system comprises a data management unit and an onboard data-repository; the data management unit being operatively connectible to at least one computer processor and configured to:
establish a remote communication link, for directly communicating with at least one situation awareness data (SAD) source, and a communication network for communicating with a plurality of participating entities, wherein the at least one data source is inaccessible to the plurality of participating entities; obtain situation awareness data from the at least one SAD source;
process the SAD and determine, based on data management logic being accessible to the data management unit the following:
  a) whether to store the obtained SAD locally in the onboard data-repository and/or whether to transmit the obtained SAD to a remote data-repository unit; and
  b) whether or not to automatically provide the obtained SAD to at least one participating entity of the plurality of participating entities;
automatically provide the obtained SAD to at least one participating entity depending on the determination; and provide the obtained SAD to at least one participating entity responsive to a request received from the at least one participating entity.

\* \* \* \* \*